US012564174B1

(12) United States Patent
Ying et al.

(10) Patent No.: US 12,564,174 B1
(45) Date of Patent: Mar. 3, 2026

(54) AUTOMATIC CAT LITTER BOX

(71) Applicant: Zhejiang Beijing Technology Co., Ltd., Lishui (CN)

(72) Inventors: Weihong Ying, Lishui (CN); Ximing Yin, Lishui (CN); Zhoulin Ying, Lishui (CN)

(73) Assignee: Zhejiang Beijing Technology Co., Ltd., Lishui (CN)

( * ) Notice: Subject to any disclaimer, the term of this patent is extended or adjusted under 35 U.S.C. 154(b) by 0 days.

(21) Appl. No.: 19/065,001

(22) Filed: Feb. 27, 2025

(30) Foreign Application Priority Data

Dec. 23, 2024 (CN) .......................... 202411901379.3

(51) Int. Cl.
*A01K 1/01* (2006.01)

(52) U.S. Cl.
CPC ................................. *A01K 1/0114* (2013.01)

(58) Field of Classification Search
CPC ..... A01K 1/011; A01K 1/0114; A01K 1/0107
USPC ................................................. 119/166, 165
See application file for complete search history.

(56) References Cited

U.S. PATENT DOCUMENTS

| | | | | |
|---|---|---|---|---|
| 5,048,464 | A | * | 9/1991 | Shirley ................ A01K 1/0114 |
| | | | | 209/362 |
| 5,509,379 | A | * | 4/1996 | Hoeschen ............ A01K 1/0114 |
| | | | | 209/288 |
| 2008/0017123 | A1 | * | 1/2008 | Chin ...................... A01K 1/011 |
| | | | | 119/166 |
| 2020/0060221 | A1 | * | 2/2020 | Fan ...................... A01K 1/0114 |
| 2022/0125006 | A1 | * | 4/2022 | Smith .................. A01K 1/0114 |

FOREIGN PATENT DOCUMENTS

| | | | | | |
|---|---|---|---|---|---|
| CN | | 114667937 | A | * | 6/2022 ........... A01K 1/0107 |
| CN | | 113557971 | B | | 12/2022 |
| DE | | 19718689 | A1 | * | 11/1998 ........... A01K 1/0107 |
| WO | WO-2022110690 | A1 | * | 6/2022 ........... A01K 1/0114 |

* cited by examiner

*Primary Examiner* — Zoe Tam Tran
(74) *Attorney, Agent, or Firm* — JEEN IP LAW, LLC

(57) ABSTRACT

An automatic cat litter box is provided, which includes a base; a drum rotatably provided on the base, the drum is installed on the base through a weighing mechanism; a guide-sand plate and a filter-sand mesh provided in the drum through a detachable structure; a toilet compartment cover provided on the base through an adjustable mechanism, and an internal structure of the drum is a detachable structure, internal components can be disassembled for easy cleaning of the drum and internal structure. At the same time, a shrinking structure is used to render the product to have small size and have a large actual usage space, thereby reducing packaging size and transportation cost.

9 Claims, 18 Drawing Sheets

AUTOMATIC CAT LITTER BOX

CROSS-REFERENCE TO RELATED APPLICATIONS

This application claims priority to Chinese Patent Application No. 202411901379.3, filed on Dec. 23, 2024, which is hereby incorporated by reference in its entirety.

TECHNICAL FIELD

The present disclosure relates to the field of pet supplies technologies, and in particular, to an automatic cat litter box.

BACKGROUND

In the process of implementing the present disclosure, user found that the existing technology has at least the following problems.

In traditional technology, the internal structure of an automatic cat litter box is a fixed structure, and the internal of the litter box is very easy to get dirty. If a fixed structure is used, it will be difficult to clean the internal of the litter box.

CN113557971B discloses an open automatic cat litter box, which includes a receiving chamber, a base, and a toilet compartment. The receiving chamber is a quarter spherical cavity formed by a right side of the toilet compartment and a quarter spherical surface fixedly installed on its surface. The top surface of the toilet compartment is provided with an inverted trapezoidal platform shaped concave square opening, and a cover plate is horizontally arranged below the opening. The cover plate is clamped inside the toilet compartment, but the above technical problem cannot be solved.

SUMMARY

The technical problem to be solved by the present disclosure is to provide an automatic cat litter box, in which an internal structure of the drum is a detachable structure, and internal components can be disassembled for easy cleaning of the drum and internal structure.

In order to solve the above technical problems, the technical solution adopted by the present disclosure is an automatic cat litter box, including:

a base;

a drum, rotatably provided on the base, and the drum is installed on the base through a weighing mechanism;

a guide-sand plate and a filter-sand mesh that are disassembled provided in the drum through a detachable structure;

a toilet compartment cover, which is provided on the base through an adjustable mechanism.

In some embodimenta of the present disclosure, the weighing mechanism includes:

a bracket, which is fixedly provided on the base;

a roller, which is rotatably provided on the bracket, extended from the base, and is capable of supporting the drum;

a weighing module, which is fixedly provided at a bottom of the bracket;

a support foot, a first end of the support foot is extended from the base, and a second end thereof is connected to the weighing module.

In some embodiments of the present disclosure, the detachable structure includes:

a front decorative ring, which is provided on a first end of the drum;

the filter-sand mesh, which is rotatably connected to the front decorative ring;

a box body, which is provided at a bottom of the drum and is clamped with the front decorative ring;

the guide-sand plate, which is provided at an upper of the drum and is connected to the drum; and a fixing back cover, which is connected to a second end of the drum.

In some embodiments of the present disclosure, the adjustable mechanism includes:

side beams, which are provided on two sides of the base;

the toilet compartment cover, which is slidably provided on the side beams, a bottom of the toilet compartment cover is provided with a sliding seat, and the sliding seat is slidably cooperated with the side beams;

a guiding mechanism, which is provided on the base and the toilet compartment cover;

a positioning mechanism, which is provided on the base and the toilet compartment cover; and a toilet compartment, which is detachably provided in the toilet compartment cover.

In some embodiments of the present disclosure, the base includes a base body and a base cover, the base body and the base cover are connected by screws; the bracket is fixedly provided on the base body, and the base cover is provided with a through hole, the roller is extended form the through hole; an outer circumference of the drum is provided with a stainless-steel sleeve.

In some embodiments of the present disclosure, the drum is provided with a connection hole, a first end of the guide-sand plate is connected to the connection hole by screws; the fixing back cover is connected to a second end of the guide-sand plate by screws; the front decorative ring is provided with a socket, an end of the filter-sand mesh is provided with a rotating shaft, and the rotating shaft is rotatably provided in the socket.

In some embodiments of the present disclosure, the guiding mechanism includes a sidling groove and a sliding rod that are matched with each other, the sliding rod is fixedly provided on the toilet compartment cover, and the sliding groove is provided on the base; the positioning mechanism includes a fixed buckle and a fixed clamp; the fixed buckle is provided on the base, and the fixed clamp is provided on the toilet compartment cover; the base is provided with a rear seat, and the sliding groove is provided on the rear seat.

In some embodiments of the present disclosure, a weight reducing hole is provided near a middle of the base; a bottom of the bracket is connected to the base body, an upper of the bracket is connected to the base cover; each of four corners of the base is provided with one set of bracket, roller, weighing module, and support foot.

In some embodiments of the present disclosure, a clamp block is provided on the front decorative ring, and the box body is adapted to the clamp block; the front decorative ring is connected to the first end of the drum through screws; the second end of the drum is further fixedly provided with a large gear.

In some embodiments of the present disclosure, a reinforcing rod is provided in a middle of the sliding rod, and the reinforcing rod is made of steel; the toilet compartment cover is provided with a guide groove that is compatible with the toilet compartment.

One of the above technical solutions has the following advantages or beneficial effects: an internal structure of the drum is a detachable structure, and internal components can be disassembled for easy cleaning of the drum and internal structure. At the same time, a shrinking structure is used to render the product to have small size, and an actual usage space is larger, thereby reducing packaging size and transportation cost.

Numeral reference: 11—base; 111—base body; 112—base cover; 113—weight reducing hole; 114—through hole; 115—side beam; 116—rear seat; 117—sliding groove; 118—fixed buckle; 12—drum; 121—connection hole; 13—bracket; 14—roller; 15—weighing module; 16—support foot; 21—front decorative ring; 211—socket; 212—clamp block; 22—fixing back cover; 23—large gear; 24—guide-sand plate; 25—filter-sand mesh; 251—rotating shaft; 26—box body; 27—screw; 31—toilet compartment cover; 311—sliding seat; 312—sliding rod; 313—reinforcing rod; 314—fixed clamp; 32—toilet compartment.

DESCRIPTION OF EMBODIMENTS

Below, the technical solutions in the embodiments of the present disclosure will be clearly and completely described in combination with the accompanying drawings. Obviously, the described embodiments are only a part of the embodiments of the present disclosure, not all of them. Based on the embodiments of the present disclosure, all other embodiments obtained by those skilled in the art without creative work are within the protection scope of the present disclosure.

Figure 1:
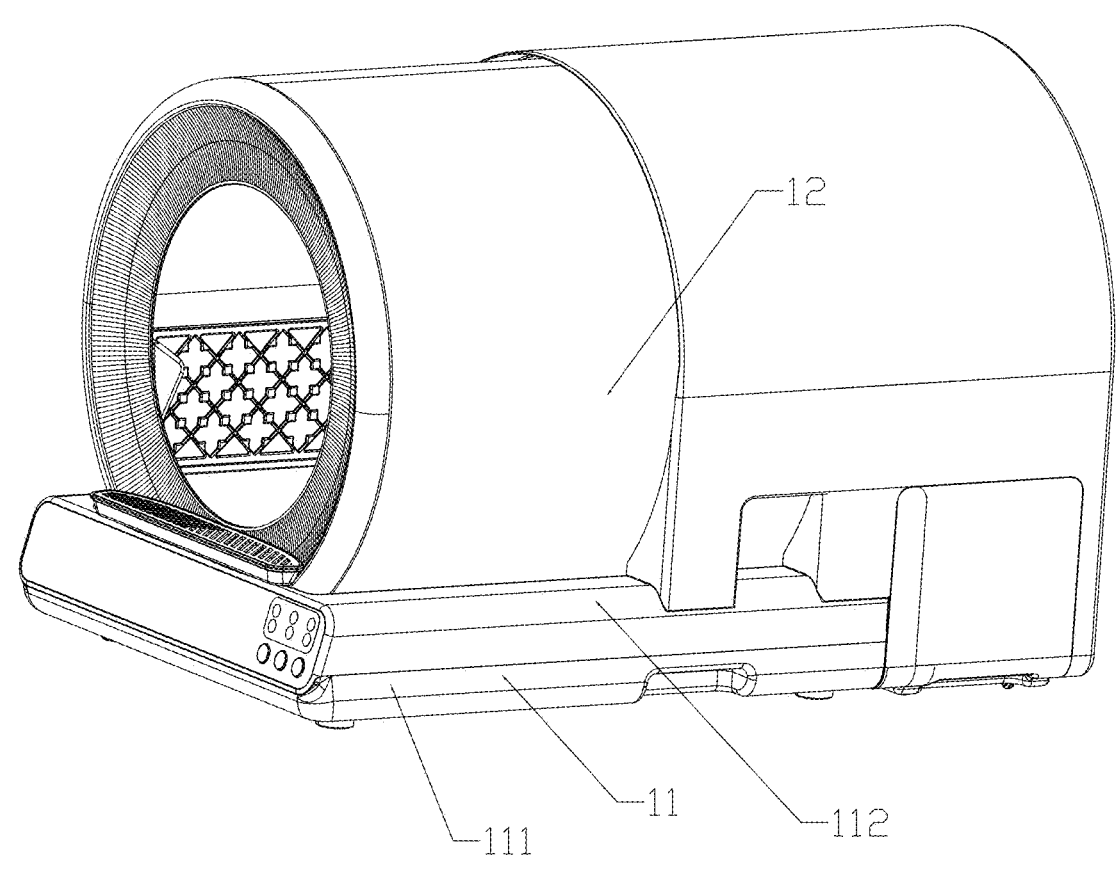
FIG. 1 is a first schematic structural diagram of an automatic cat litter box provided in an embodiment of the present disclosure.
Figure 2:
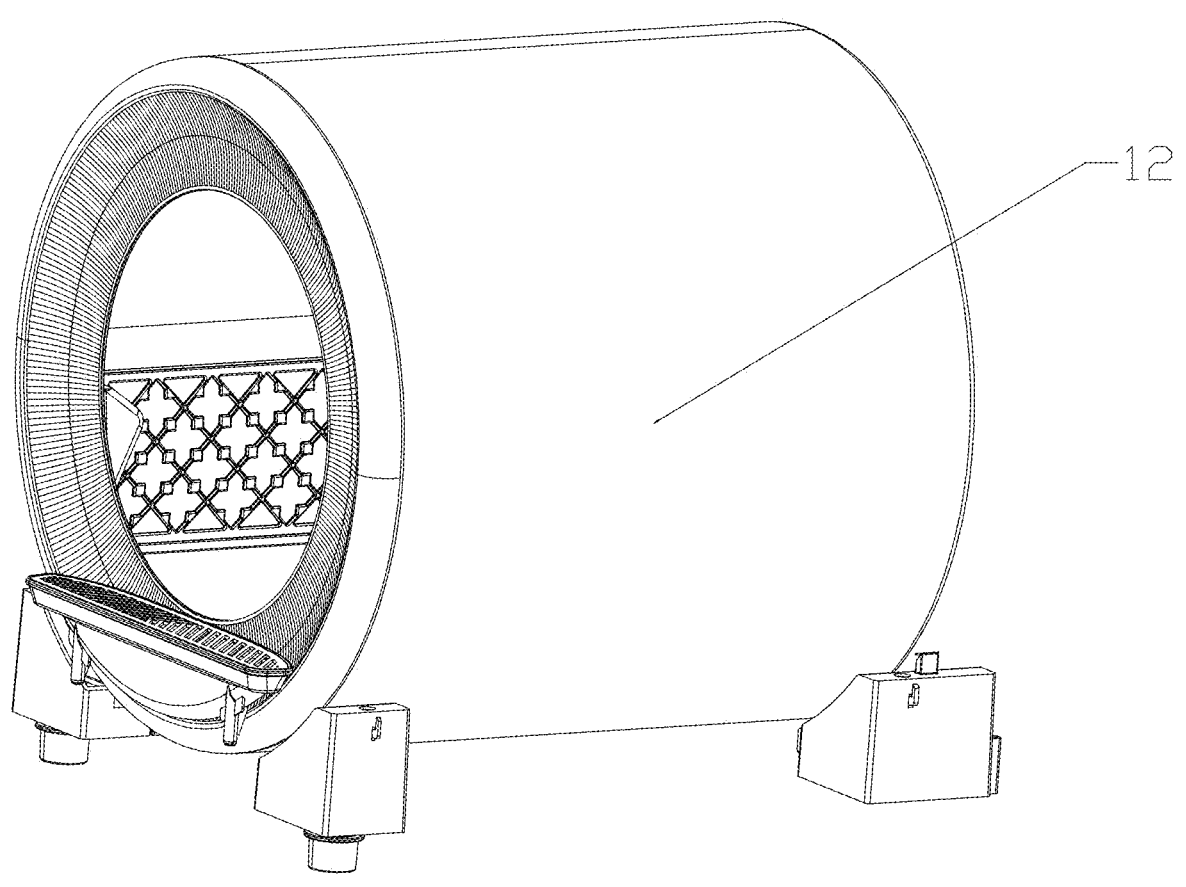
FIG. 2 is a second schematic structural diagram of the automatic cat litter box shown in FIG. 1.
Figure 3:
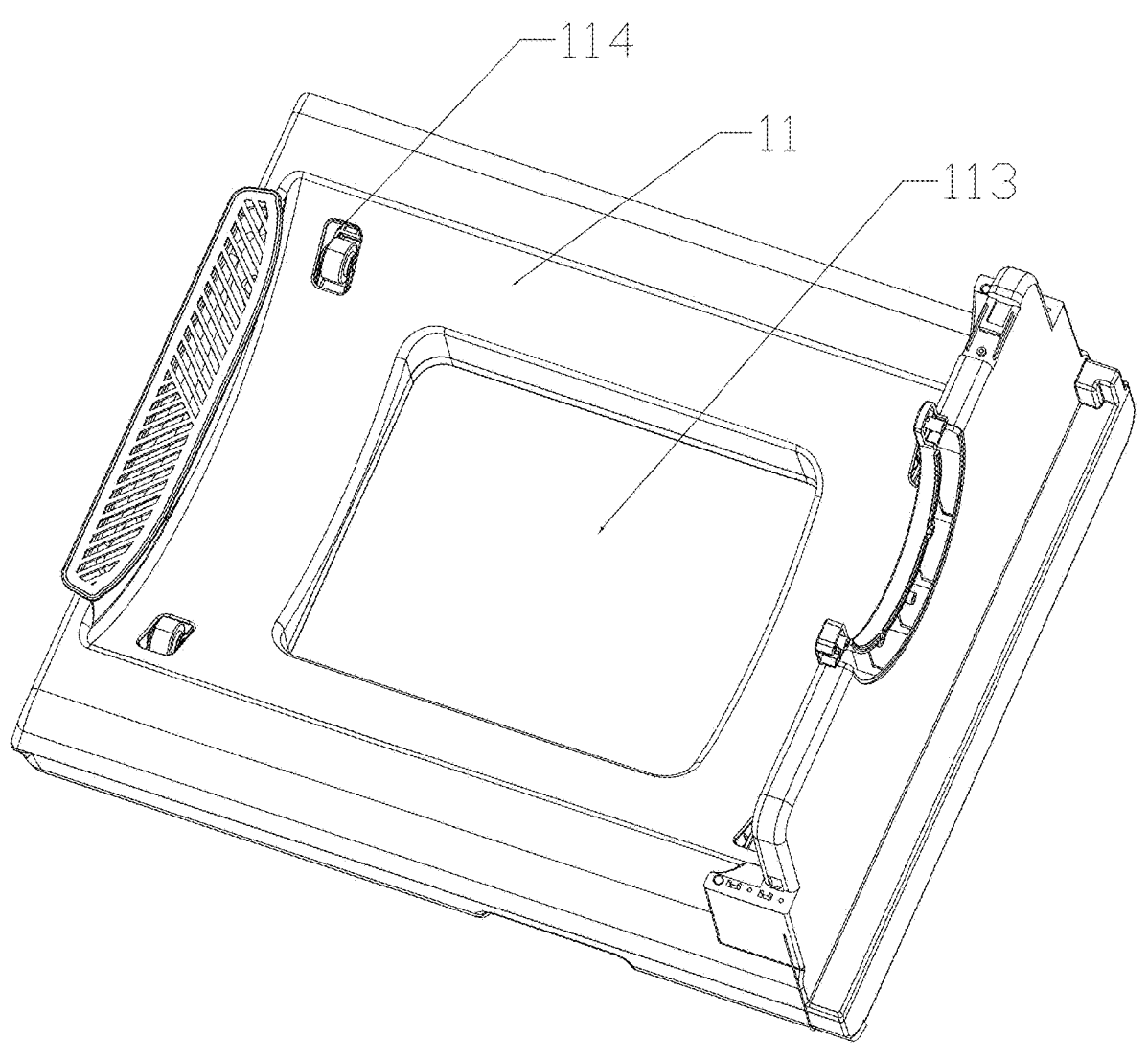
FIG. 3 is a third schematic structural diagram of the automatic cat litter box shown in FIG. 1.
Figure 4:
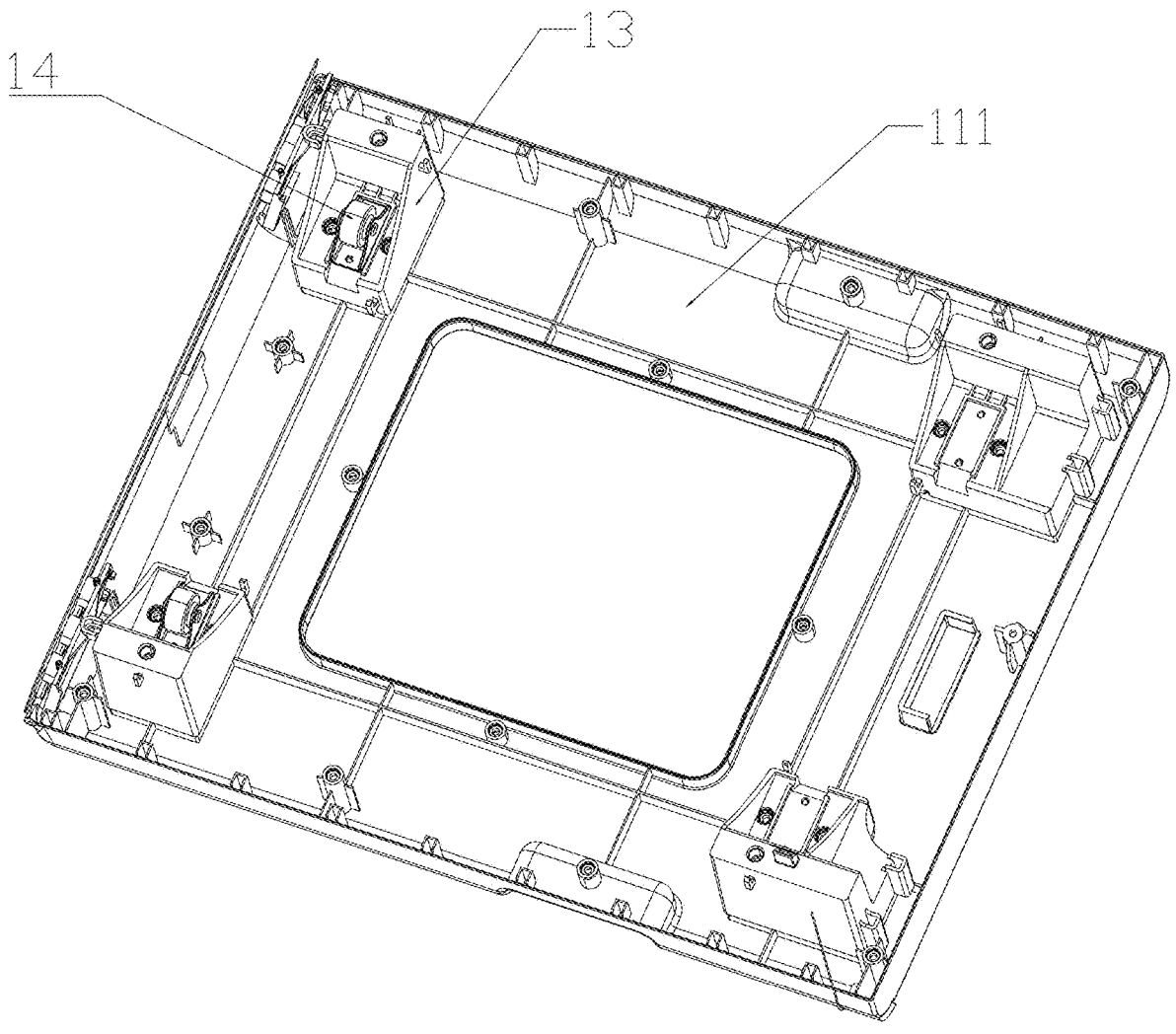
FIG. 4 is a fourth schematic structural diagram of the automatic cat litter box shown in FIG. 1.
Figure 5:
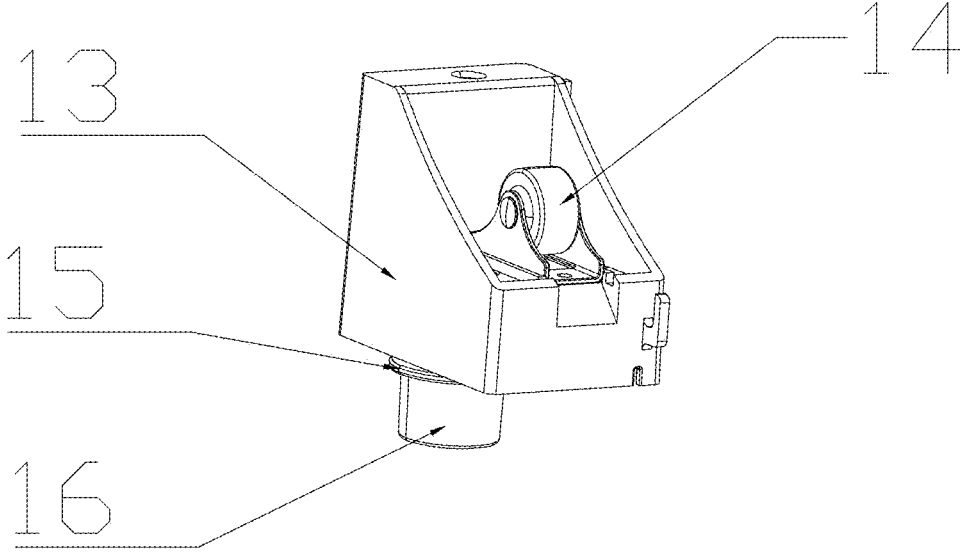
FIG. 5 is a fifth schematic structural diagram of the automatic cat litter box shown in FIG. 1.
Figure 6:
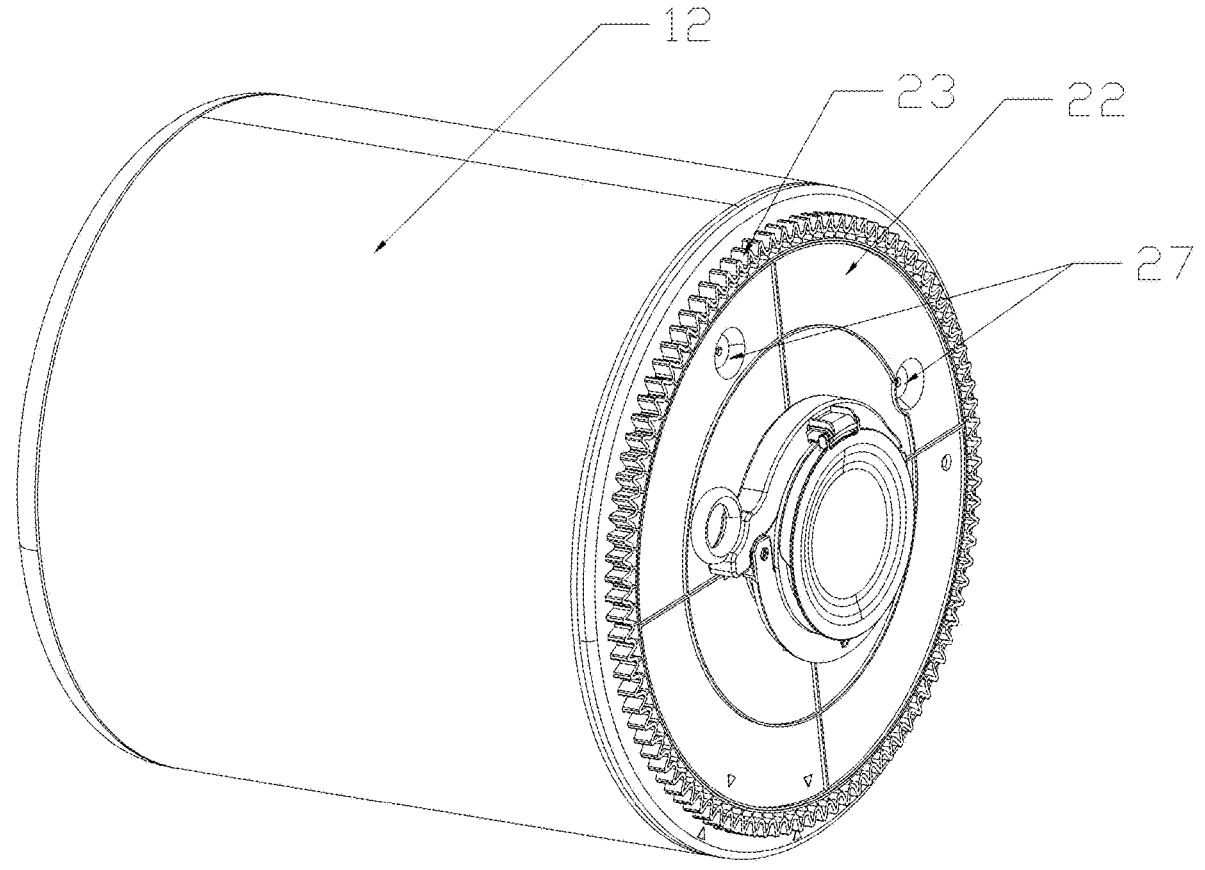
FIG. 6 is a sixth schematic structural diagram of the automatic cat litter box shown in FIG. 1.
Figure 7:
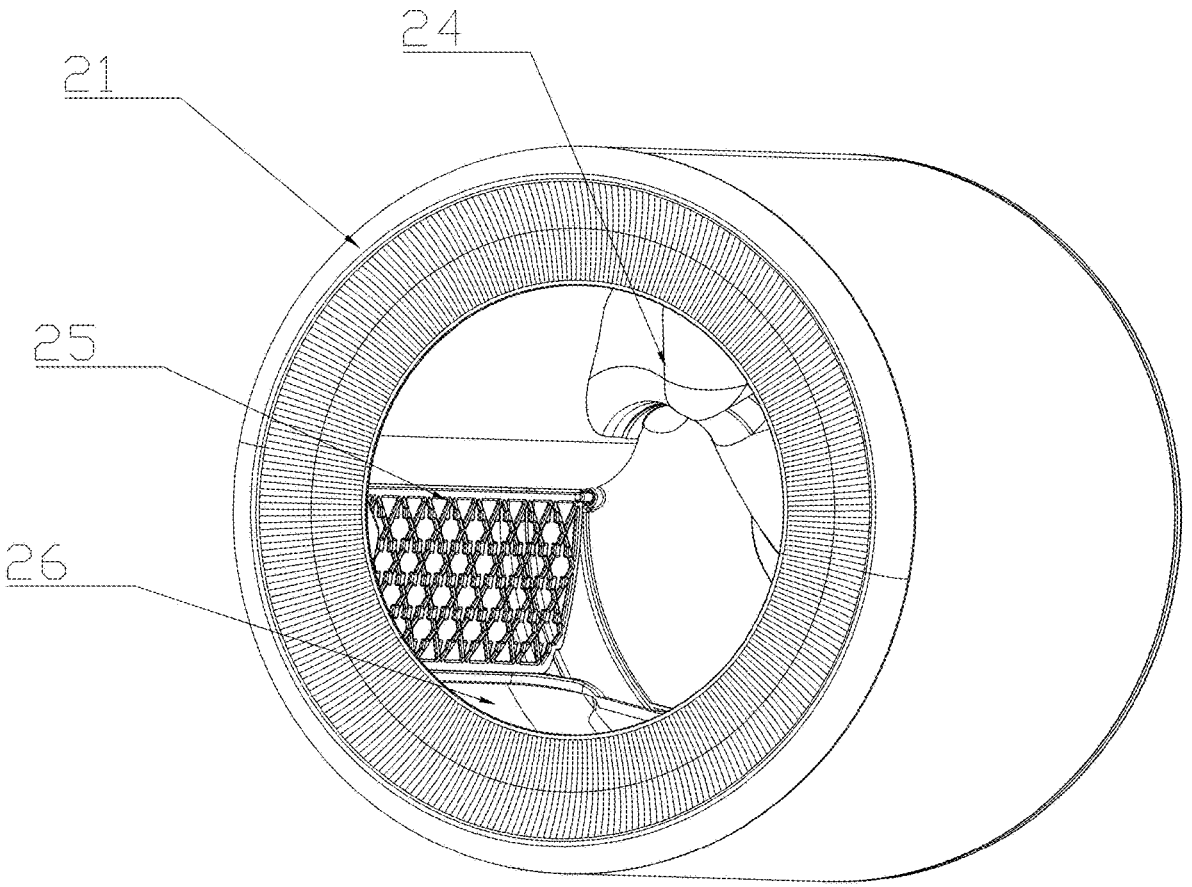
FIG. 7 is a seventh schematic structural diagram of the automatic cat litter box shown in FIG. 1.
Figure 8:
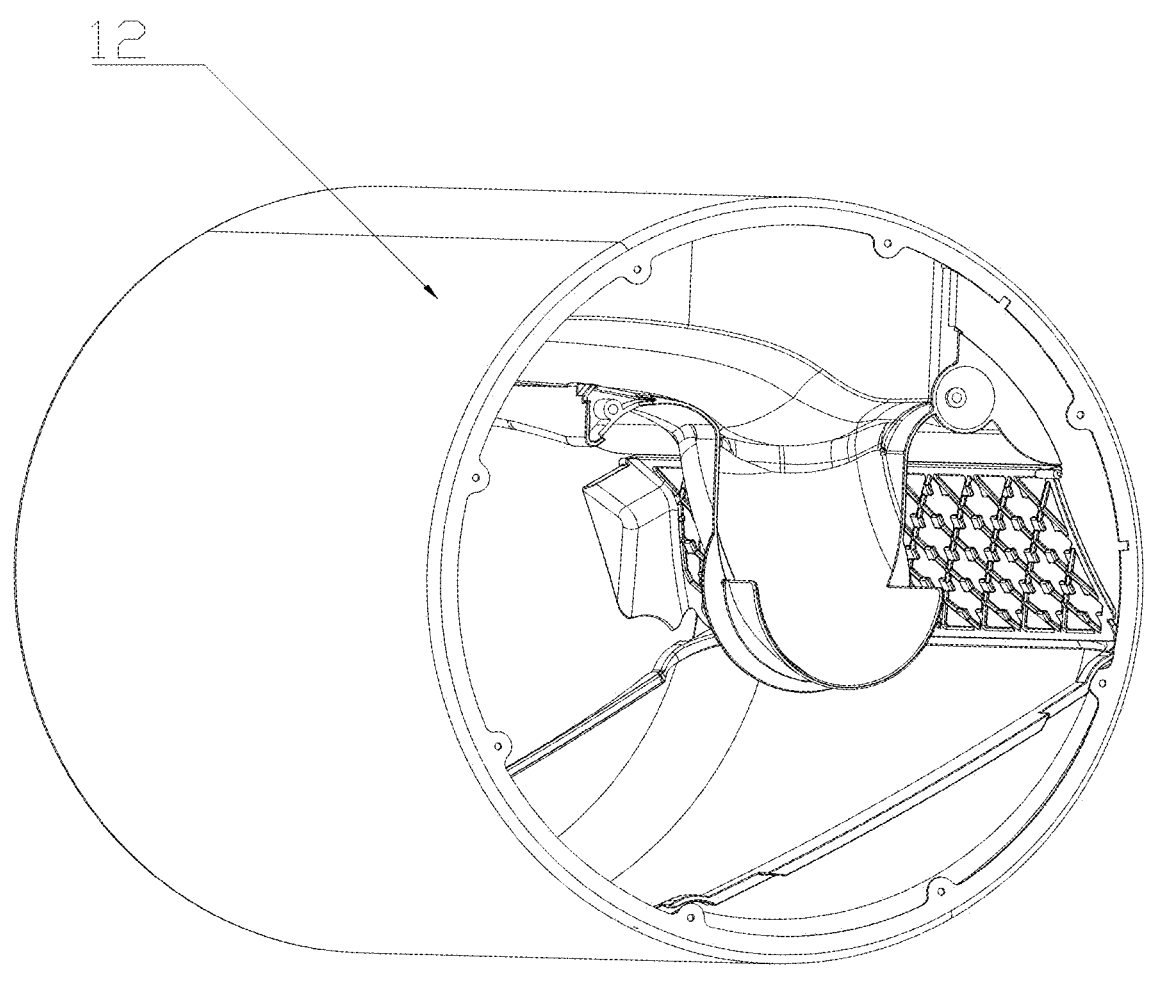
FIG. 8 is an eighth schematic structural diagram of the automatic cat litter box shown in FIG. 1.
Figure 9:
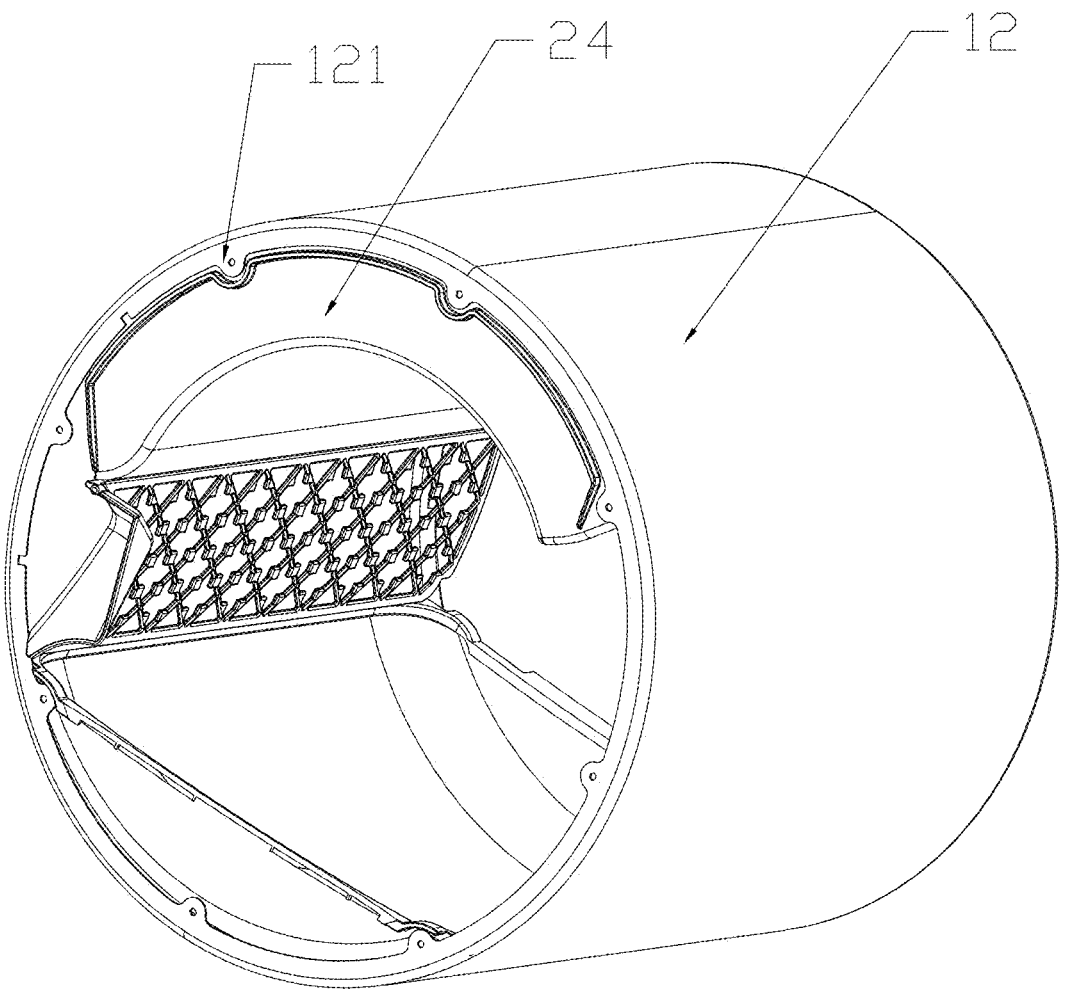
FIG. 9 is a ninth schematic structural diagram of the automatic cat litter box shown in FIG. 1.
Figure 10:
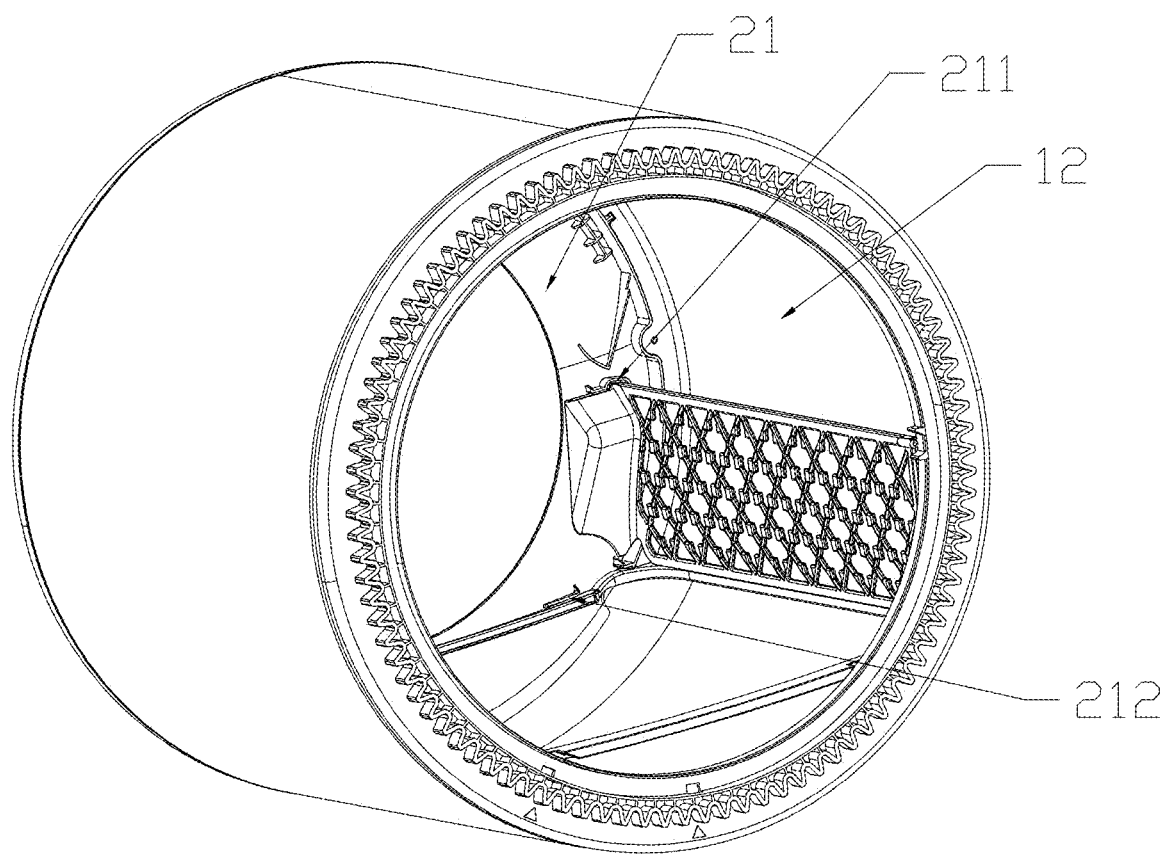
FIG. 10 is a tenth schematic structural diagram of the automatic cat litter box shown in FIG. 1.
Figure 11:
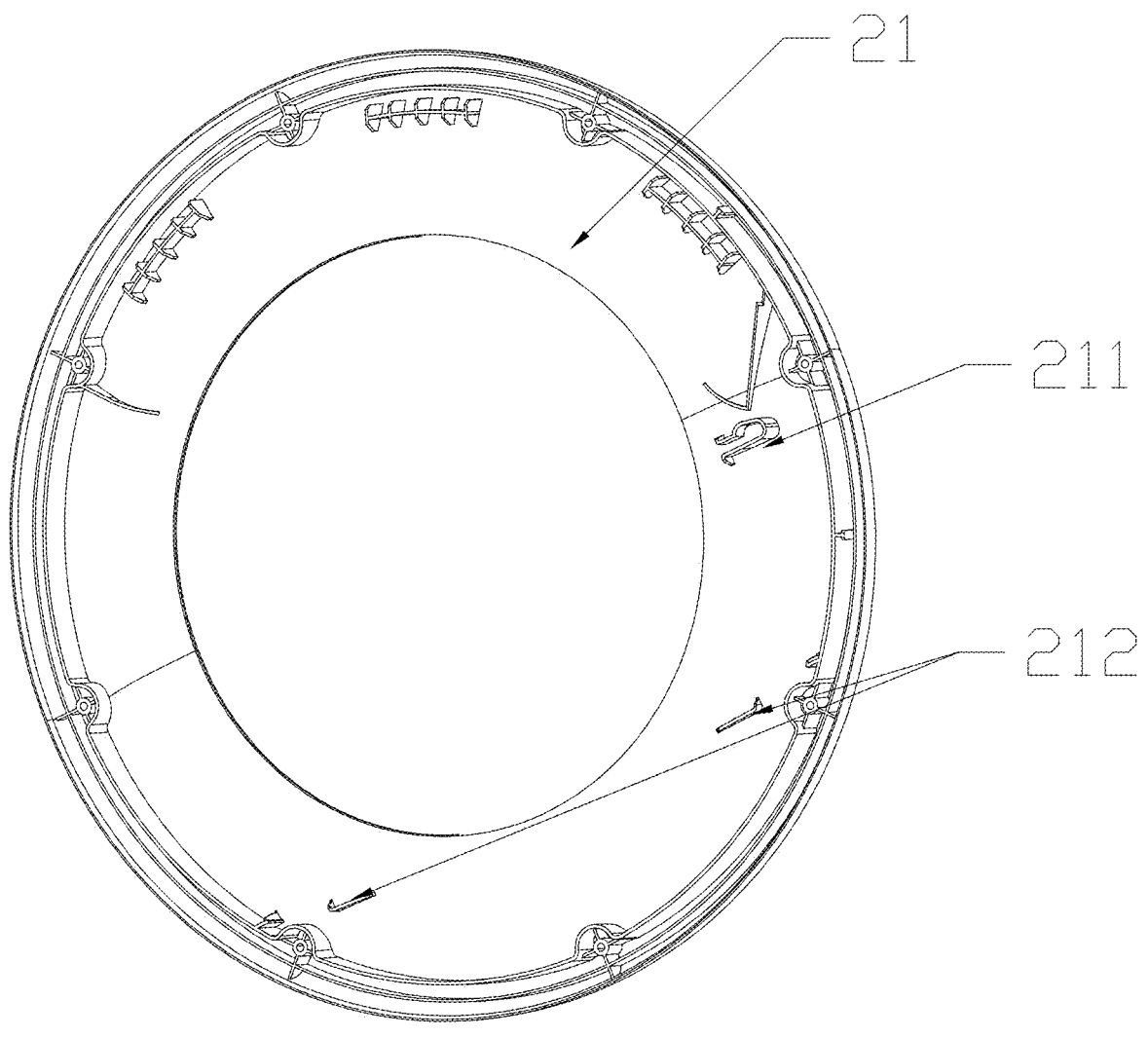
FIG. 11 is an eleventh schematic structural diagram of the automatic cat litter box shown in FIG. 1.
Figure 12:
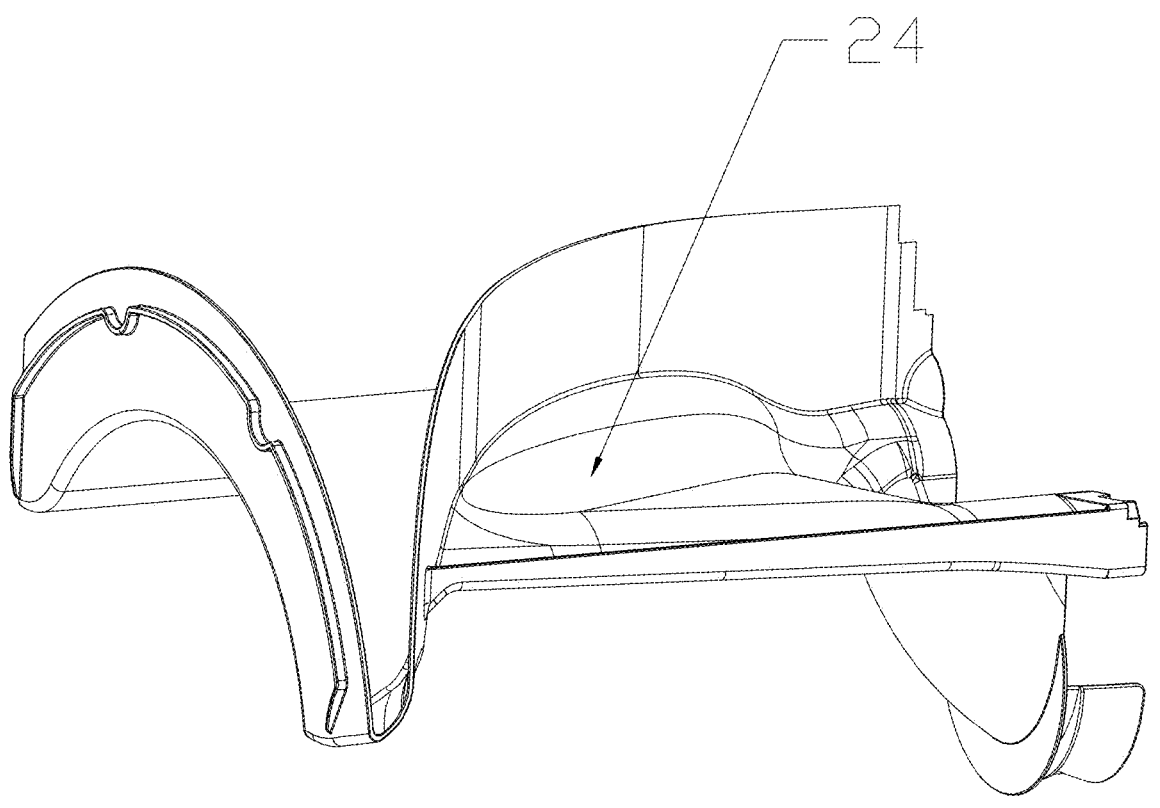
FIG. 12 is a twelfth schematic structural diagram of the automatic cat litter box shown in FIG. 1.
Figure 13:
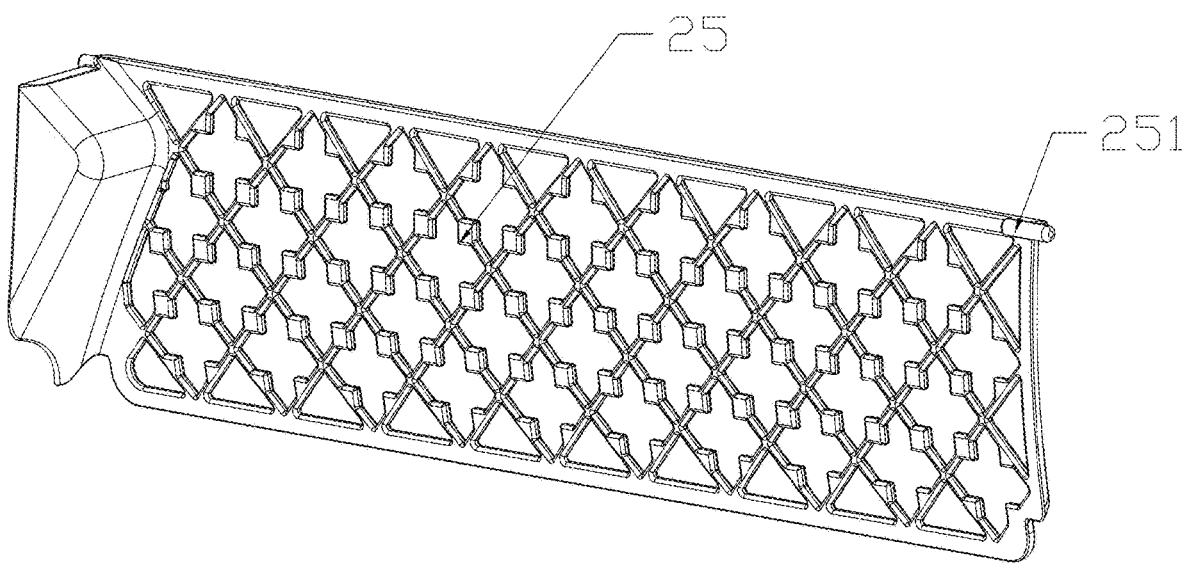
FIG. 13 is a fourteenth schematic structural diagram of the automatic cat litter box shown in FIG. 1.
Figure 14:
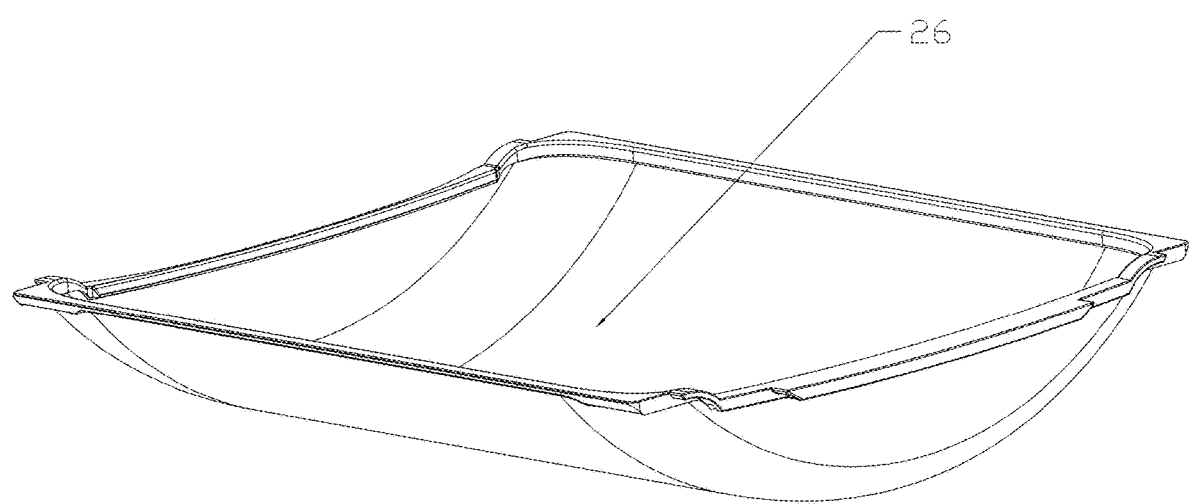
FIG. 14 is a fourteenth schematic structural diagram of the automatic cat litter box shown in FIG. 1.
Figure 15:
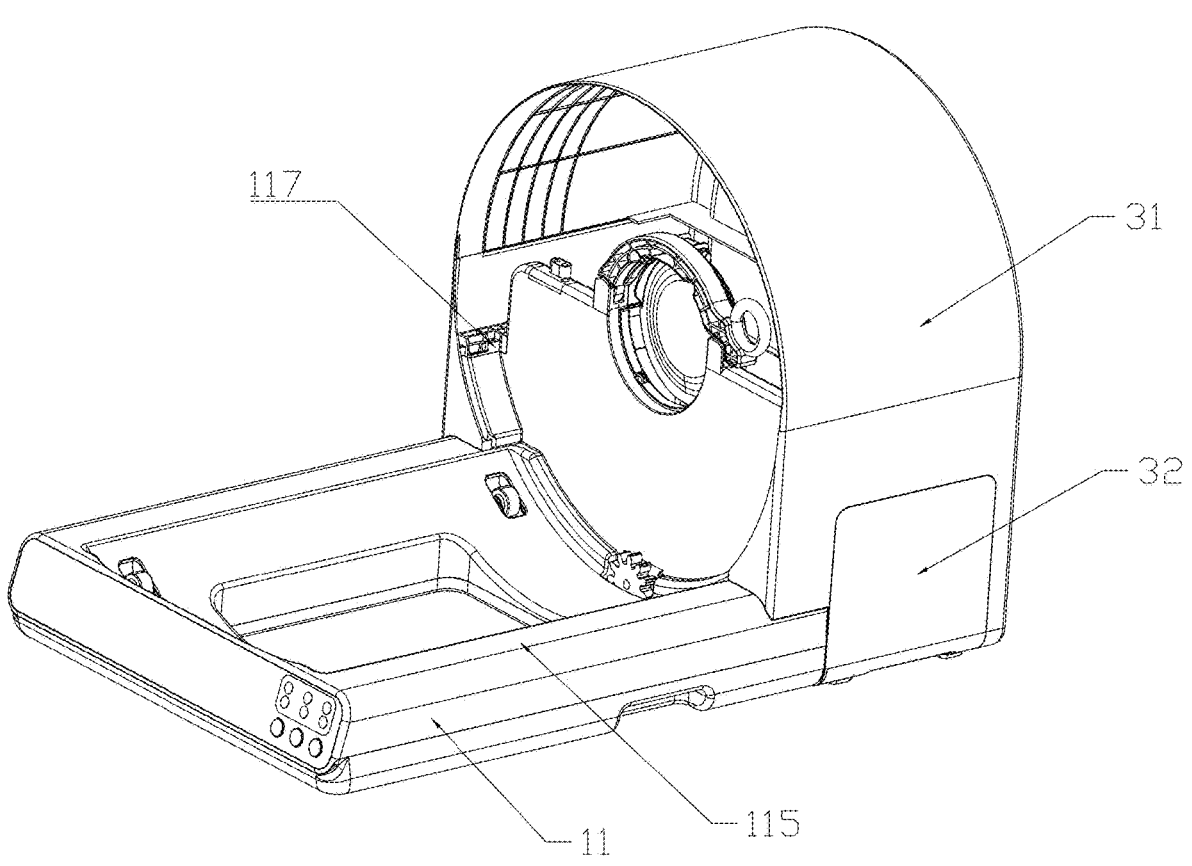
FIG. 15 is a fifteenth schematic structural diagram of the automatic cat litter box shown in FIG. 1.
Figure 16:
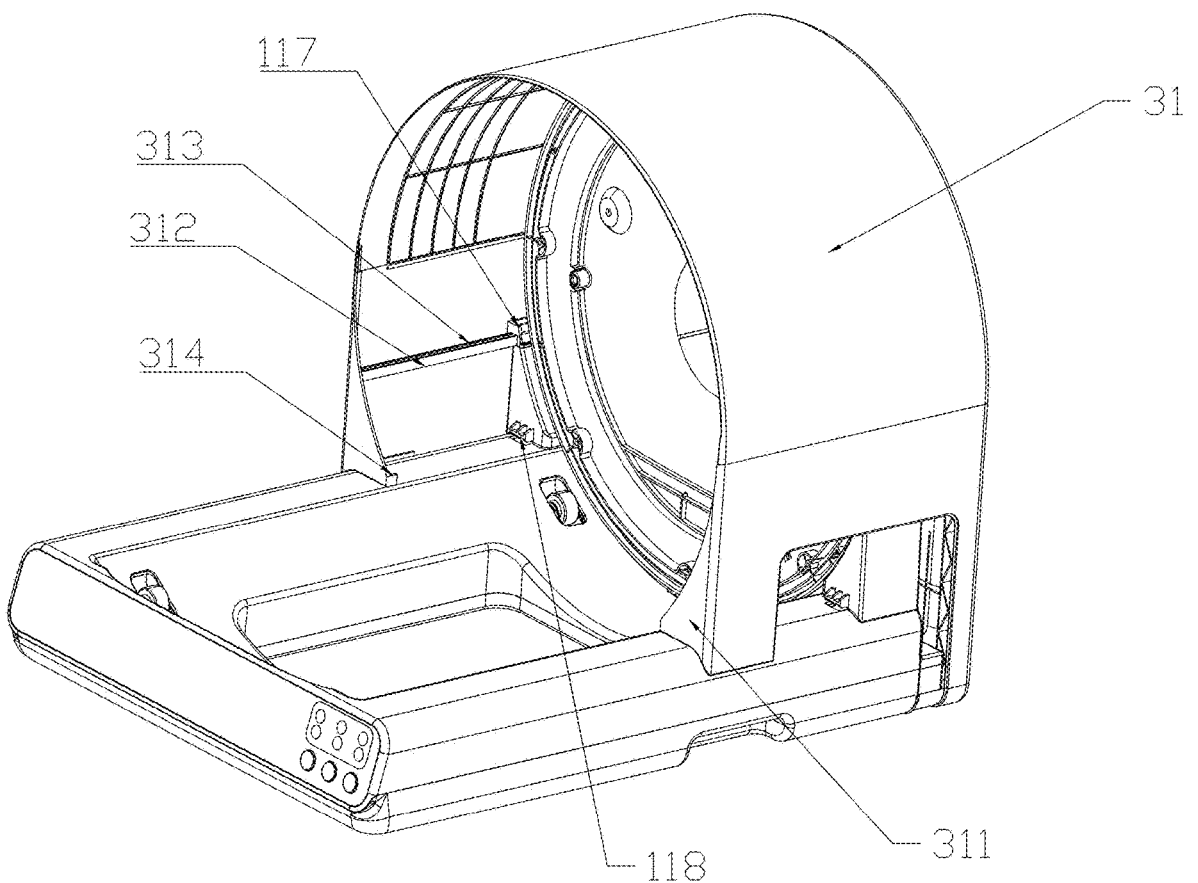
FIG. 16 is a sixteenth schematic structural diagram of the automatic cat litter box shown in FIG. 1.
Figure 17:
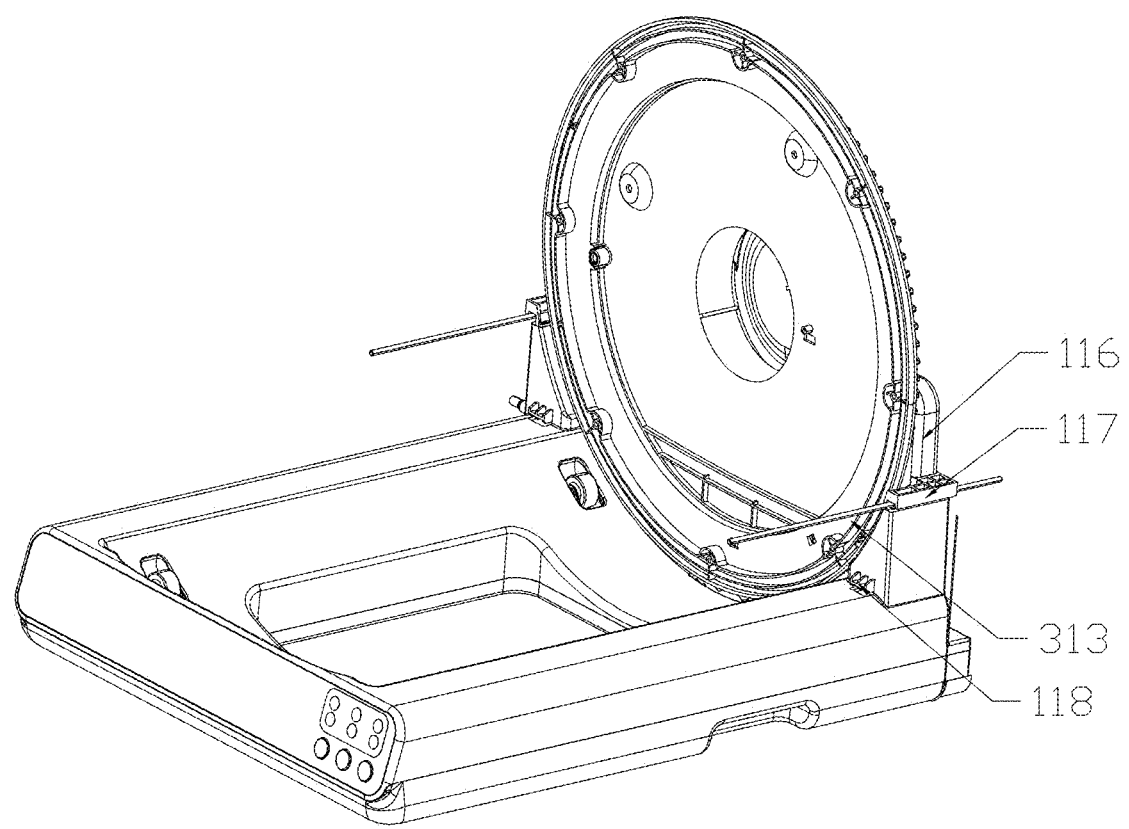
FIG. 17 is a seventeenth schematic structural diagram of the automatic cat litter box shown in FIG. 1.
Figure 18:
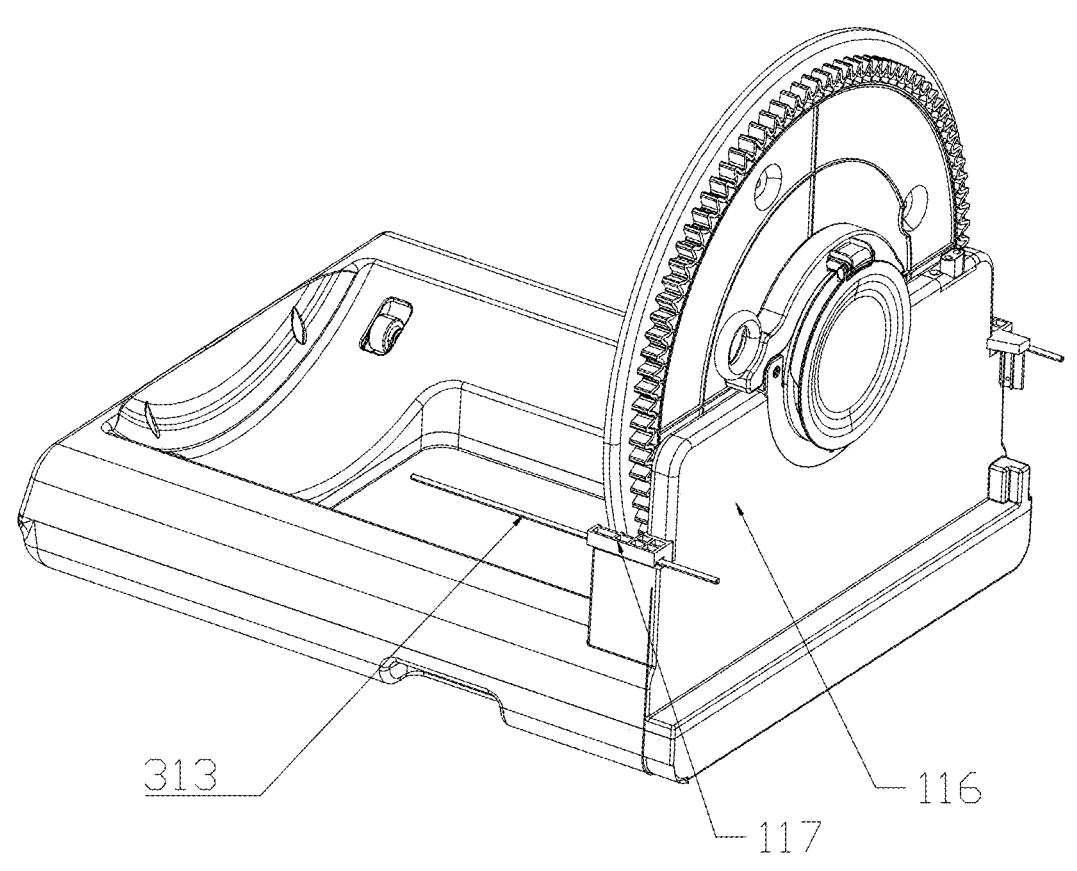
FIG. 18 is an eighteenth schematic structural diagram of the automatic cat litter box shown in FIG. 1.

Referring to FIGS. 1-18, an automatic cat litter box including: a base; a drum rotatably provided on the base, and the drum is installed on the base through a weighing mechanism; a guide-sand plate and a filter-sand mesh that are provided in the drum through a detachable structure; a toilet compartment cover provided on the base through an adjustable mechanism; an internal structure of the drum is a detachable structure, and internal components can be disassembled for easy cleaning of the drum and internal structure. At the same time, a shrinking structure is used to render the product to have small size, and an actual usage space is larger, thereby reducing packaging size and transportation cost.

The weighing mechanism includes the base 11; the drum 12 rotatably supported on the base; a bracket 13 fixedly provided on the base; a roller 14 rotatably provided on the bracket 13, the roller 14 is extended out of the base and can support the drum 12; a weighing module 15 fixedly provided at a bottom of the bracket 13; a support foot 16, a first end of the support foot 16 is extended out of the base, and a second end thereof is connected to the weighing module 15. Not only can it serve as a defecation device for cats, but it can also achieve weighing function and meet the diverse functional needs.

The base includes a base body 111 and a base cover 112, the base body 111 and the base cover 112 are connected by screws. By enclosing the base body 111 and the base cover 112 into the base, various electronic devices can be installed in an internal space.

The bracket 13 is fixedly provided on the base body 111, and the base cover 112 is provided with a through hole 114, through which the roller 14 is extended. The roller 14 extends the through hole 114 and can abut against the drum 12, thereby providing support for the drum 12. At the same time, the drum 12 can freely rotate on the roller 14.

An outer circumference of the drum 12 is provided with a stainless-steel sleeve. The stainless-steel sleeve covers the drum body, which increases a structural strength of the drum 12 and prevents cats from scratching the drum 12. The stainless-steel sleeve is also easy to clean.

There is a weight reducing hole 113 provided near a middle of the base, which plays a role in reducing weight.

A bottom of the bracket 13 is connected to the base body 111, and an upper of the bracket 13 is connected to the base cover 112. Two ends of the bracket 13 support the base body 111 and the base cover 112, which can improve a strength between base body 111 and the base cover 112.

Each of four corners of the base is provided with one set of bracket 13, roller 14, weighing module 15, and support foot 16, thereby providing more stable and reliable support.

There are a total of four weighing modules, four rollers supporting the drum body are directly fixed on the bracket. The weighing module is fixed on the bracket. The support foot is connected to the weighting module. The bracket is fixed on the base cover, and the base strengthens the support.

The detachable mechanism includes the drum 12; a front decorative ring 21 provided on a first end of the drum 12; the filter-sand mesh 25 that is rotatably connected to the front decorative ring 21; a box body 26 provided at a bottom of the drum 12, and the box body 26 is clamped with the front decorative ring 21; the guide-sand plate 24 provided at an upper of the drum 12, and the guide-sand plate 24 is connected to the drum 12; a fixing back cover 22 connected to a second end of the drum 12. The filter-sand mesh 25, the box body 26, and the guide-sand plate 24 are all detachable structures. The internal structure of the drum is a detachable structure, and the internal components can be disassembled for easy cleaning of the drum and internal structure.

The drum 12 is provided with a connection hole 121, a first end of the guide-sand plate 24 is screwed to the connection hole 121. The fixing back cover 22 is connected to a second end of the guide-sand plate 24 through screws 27. The first end of the guide-sand plate 24 is connected to the drum 12 with screws, and the second end thereof is connected to the fixing back cover 22 through the screws 27. When disassembling, two screws 27 on the fixing cover are removed and then the fixing cover is removed. Other parts can be directly extracted, and the internal components can be disassembled for easy cleaning of the drum and internal structure.

The front decorative ring 21 is provided with a socket 211, an end of the filter-sand mesh 25 is provided with a rotating shaft 251, and the rotating shaft 251 is rotatably provided in the socket 211. The front decorative ring 21 is clamped in the socket 211 through the rotating shaft 251, and can be disassembled from the socket 211 for easy disassembly and cleaning of the filter-sand mesh 25.

The front decorative ring 21 is provided with a clamp block 212, and the box body 26 is adapted to the clamp block 212. The box body 26 is clamped to the front decorative ring 21 for easy disassembly and cleaning.

The front decorative ring 21 is connected to the first end of the drum 12 by screws, rendering it easy to remove the front decorative ring 21.

The second end of the drum 12 is further fixedly provided with a large gear 23, which plays a role in power transmission. Through a motor and the gear, the large gear 23 is driven to rotate, thereby driving the drum 12 to rotate.

The decorative ring and the large gear are respectively fixed on the drum. The guide-sand plate, the filter-sand mesh, and a soft rubber pad are provided in a plug-in structure. After covering the fixed cover (2 buckle positions, 2 screw positions), a screw is used with a handle to directly connect the fixing cover to the guide-sand plate, and all accessories are clamped inside the drum to achieve functionality. When disassembling, two screws on the fixing cover are removed and then the fixing cover is removed, and the other parts are directly extracted.

The internal structure of the drum is a detachable structure, and the internal components can be disassembled for easy cleaning of the drum and internal structure.

The adjustable mechanism includes the base 11; side beams 115 provided on two sides of the base 11; the toilet compartment cover 31 slidably provided on the side beams 115, and a bottom of the toilet compartment cover 31 is provided with a sliding seat 311, and the sliding seat 311 is slidably cooperated with the side beams 115; a guiding mechanism provided on the base 11 and the toilet compartment cover 31; a positioning mechanism provided on the base 11 and the toilet compartment cover 31; a toilet compartment that is disassembly provided in the toilet compartment cover 31. The toilet compartment cover 31 and the base 11 are slidably connected and can be a retractable structure, which renders the product to have small size, and have a larger actual usage space, thereby reducing packaging size and transportation cost.

The guiding mechanism includes a sliding groove 117 and a sliding rod 312 that are matched with each other. The sliding rod 312 is fixedly provided on the toilet compartment cover 31, and the sliding groove 117 is provided on the base 11. During a relative sliding process between the toilet compartment cover 31 and the base 11, the sliding rod 312 and the sliding groove 117 play a guiding role, rendering the sliding more stable and reliable, thereby preventing the toilet compartment cover 31 and the base 11 from disengaging from each other.

The positioning mechanism includes a fixed buckle 118 and a fixed clamp 314. The fixed buckle 118 is provided on the base 11, and the fixed clamp 314 is provided on the toilet compartment cover 31. When the toilet compartment cover 31 and the base 11 are fully extended, there is a buckle on the base 11 cover to fasten the back cover, thereby enhancing and maintaining the stability of the back cover.

The base 11 is provided with a rear seat 116, and the sliding groove 117 is provided on the rear seat 116 for easy installation of the sliding groove 117.

A middle of the sliding rod 312 is provided with a reinforcing rod 313, and the reinforcing rod 313 is made of steel. The reinforcing rod 313 serves to strengthen the sliding rod 312 and prevent plastic sliding rod 312 from breaking during use.

The toilet compartment cover 31 is provided with a guide groove that is compatible with the toilet compartment, which plays a guiding role during the installation or removal process of the toilet compartment.

A shrinking structure is used to render the product to have small size, and have a larger actual usage space, thereby reducing packaging size and transportation cost.

After adopting the above structure, the internal structure of the drum body is a detachable structure, and the internal components can be disassembled for easy cleaning of the drum and internal structure. At the same time, the shrinking structure is used to render the product have small size, and have large actual usage space, thereby reducing packaging size and transportation cost.

In a description of the present disclosure, it should be understood that terms "coaxial", "bottom", "one end", "top", "middle", "other end", "top", "one side", "top", "inside", "front", "center", "two ends" and other directional or positional relationships indicated are based on the directional or positional relationships shown in the accompanying drawings, only for a convenience of describing the present disclosure and simplifying the description, and do not indicate or imply that the device or element referred to must have a specific orientation, be constructed and operated in a specific orientation, and therefore cannot be understood as a limitation of the present disclosure.

In the present disclosure, unless otherwise specified and limited, terms "installation", "setting", "connection", "fixing", "screwing" and other terms should be broadly understood, for example, it can be a fixed connection, a detachable connection, or an integrated connected; it can be a mechanical connection or an electrical connection; it can be directly connected or indirectly connected through an intermediate medium, and can be a connection within two components or an interaction relationship between two components. Unless otherwise specified, those skilled in the art can understand specific meaning of the above terms in the present disclosure according to a specific situation.

Although the embodiments of the present disclosure have been shown and described, it will be understood by those skilled in the art that various changes, modifications, substitutions, and variations can be made to these embodiments without departing from the principles and spirit of the present disclosure. The scope of the present disclosure is limited by the appended claims and their equivalents.

What is claimed is:

1. An automatic cat litter box, comprising:

a base;

a drum, rotatably provided on the base, and the drum is installed on the base through a weighing mechanism;

a guide-sand plate and a filter-sand mesh that are disassembled provided in the drum through a detachable structure;

a toilet compartment cover, which is provided on the base through an adjustable mechanism;

wherein the adjustable mechanism comprises side beams, the toilet compartment cover, a guiding mechanism, a positioning mechanism, and a toilet compartment;

wherein the guiding mechanism comprises a sliding groove and a sliding rod that are matched with each other, the sliding rod is fixedly provided on the toilet compartment cover, and the sliding groove is provided on the base;

the positioning mechanism comprises a fixed buckle and a fixed clamp;

the fixed buckle is provided on the base, and the fixed clamp is provided on the toilet compartment cover;

the base is provided with a rear seat, and the sliding groove is provided on the rear seat.

2. The automatic cat litter box according to claim 1, wherein the weighing mechanism comprises:

a bracket, which is fixedly provided on the base;

a roller, which is rotatably provided on the bracket, extended from the base, and is configured to support the drum;

a weighing module, which is fixedly provided at a bottom of the bracket;

a support foot, a first end of the support foot is extended from the base, and a second end thereof is connected to the weighing module.

3. The automatic cat litter box according to claim 2, wherein the detachable structure comprises:

a front decorative ring, which is provided on a first end of the drum;

the filter-sand mesh, which is rotatably connected to the front decorative ring;

a box body, which is provided at a bottom of the drum and is clamped with the front decorative ring;

the guide-sand plate, which is provided at an upper of the drum and is connected to the drum; and a fixing back cover, which is connected to a second end of the drum.

4. The automatic cat litter box according to claim 3, wherein the side beams are provided on two sides of the base;

the toilet compartment cover is slidably provided on the side beams, a bottom of the toilet compartment cover is provided with a sliding seat, and the sliding seat is slidably cooperated with the side beams;

the guiding mechanism is provided on the base and the toilet compartment cover;

the positioning mechanism is provided on the base and the toilet compartment cover; and the toilet compartment is detachably provided in the toilet compartment cover.

5. The automatic cat litter box according to claim 4, wherein the base comprises a base body and a base cover, the base body and the base cover are connected by screws;

the bracket is fixedly provided on the base body, and the base cover is provided with a through hole, the roller is extended from the through hole;

an outer circumference of the drum is provided with a stainless-steel sleeve.

6. The automatic cat litter box according to claim 5, wherein the drum is provided with a connection hole, a first end of the guide-sand plate is connected to the connection hole by screws;

the fixing back cover is connected to a second end of the guide-sand plate by screws;

the front decorative ring is provided with a socket, an end of the filter-sand mesh is provided with a rotating shaft, and the rotating shaft is rotatably provided in the socket.

7. The automatic cat litter box according to claim 1, wherein a weight reducing hole is provided near a middle of the base;

the bottom of the bracket is connected to the base body, an upper of the bracket is connected to the base cover;

each of four corners of the base is provided with one set of bracket, roller, weighing module, and support foot.

8. The automatic cat litter box according to claim 7, wherein a clamp block is provided on the front decorative ring, and the box body is adapted to the clamp block;

the front decorative ring is connected to the first end of the drum through screws; the second end of the drum is further fixedly provided with a large gear.

9. The automatic cat litter box according to claim 8, wherein a reinforcing rod is provided in a middle of the sliding rod, and the reinforcing rod is made of steel.

\* \* \* \* \*